United States Patent [19]

Wolff

[11] Patent Number: 4,572,715
[45] Date of Patent: Feb. 25, 1986

[54] DRILLING AND MILLING GUIDE FOR ACCOMMODATING INTERCHANGEABLE POWER TOOLS

[76] Inventor: Robert Wolff, Im Kiesacker 12, 5446 Engeln, Fed. Rep. of Germany

[21] Appl. No.: 626,994

[22] Filed: Jul. 2, 1984

[30] Foreign Application Priority Data

Dec. 2, 1983 [DE] Fed. Rep. of Germany ....... 3343683

[51] Int. Cl.⁴ .................. B23B 45/00; B23C 1/20; B27C 5/10
[52] U.S. Cl. .................... 409/180; 408/112; 144/134 D
[58] Field of Search .............. 408/112, 712; 144/136 C, 134 D, 1 F; 409/180

[56] References Cited

U.S. PATENT DOCUMENTS

| | | | |
|---|---|---|---|
| 1,590,643 | 6/1926 | Neuwelt | 408/112 |
| 2,849,900 | 9/1958 | Heidtman | 408/112 |
| 3,478,788 | 11/1969 | Zelik | 144/134 D |
| 3,534,639 | 10/1970 | Treichler | 408/112 |
| 3,890,058 | 6/1975 | Self | 408/112 |
| 3,893,372 | 7/1975 | Strakeljahn | 144/134 D |
| 4,406,568 | 9/1983 | Rogers | 409/180 |
| 4,417,835 | 11/1983 | Lund | 409/180 |

*Primary Examiner*—Jimmy C. Peters
*Attorney, Agent, or Firm*—Antonelli, Terry & Wands

[57] ABSTRACT

A drilling and milling guide for interchangeably accommodating for example, powered hand drills or milling machines, with the guide including a machine support adapted to be displaced along two parallel guide columns against a readjusting spring force, and a bottom plate at which the guide columns are pivotally mounted, with the bottom plate being provided with a central opening for accommodating different machine types and in order to enable the installation of adjustable guide stops, ends of the readjusting spring, not attached to the machine support, are fixed at a separate abutment which is adapted to be displaced and fixed along the guide columns. The bottom plate is provided with two parallel channels disposed in a plane parallel to the bottom plate for accommodating two guide rods which support a guide stop. Each of the channels pass near the guide columns and vertically through a plane extending through both guide columns.

22 Claims, 6 Drawing Figures

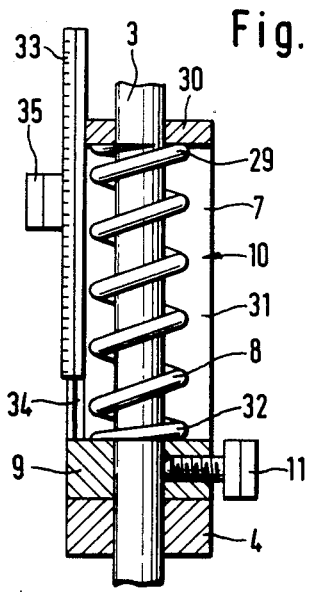
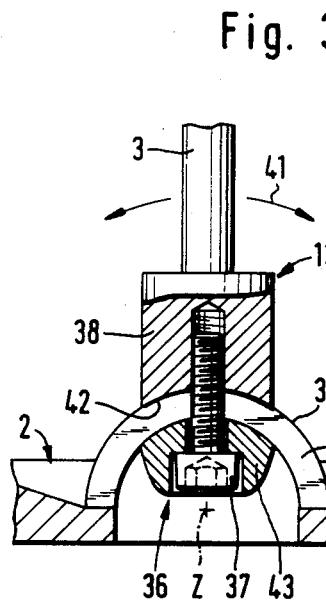
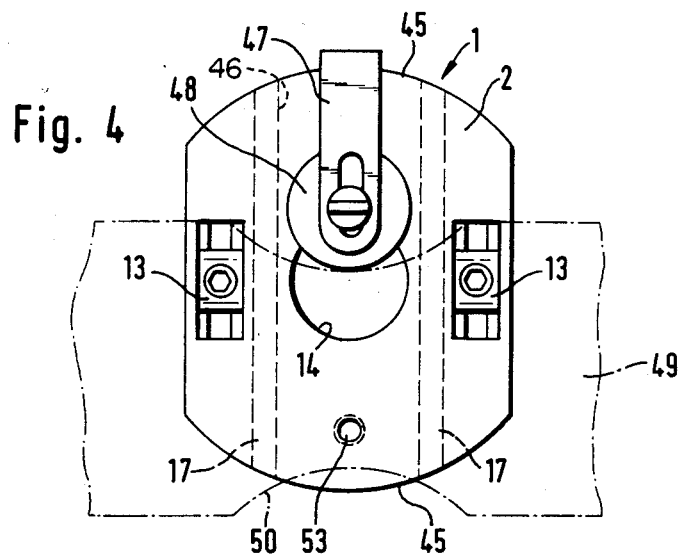

DRILLING AND MILLING GUIDE FOR ACCOMMODATING INTERCHANGEABLE POWER TOOLS

The present invention relates to a guide arrangement and, more particularly, to a drilling and milling guide for interchangeably accommodating power tools such as, for example, electrically powered hand drills, with the guide including at least one machine support adapted to be displaced along two parallel guide columns against a force of a readjusting spring, and a bottom plate, provided with a centrally disposed tool accommodating opening, at which the guide columns are pivotally mounted.

In, for example, U.S. Pat. No. 3,890,058, a drilling and milling guide for interchangeably accommodating power tools is provided which is especially designed for neckless electrically powered hand drills which have to be fixed at a main body. With this proposed guide, drill holes may be placed in a work piece at any angle to the surface of the work piece in dependence upon an inclination of the guide columns. In simple cases, with a low speed electric powered hand drill, this proposed guide is capable of enabling a milling for a surface cutting operation; however, this guide is not suitable for high speed milling operation since the high speed milling machines generally use very short clamping devices such as, for example, collet chucks instead of a chuck of the type used on an electric powered hand drill. Consequently, it is necessary to move the high speed milling machine very close to the surface of the work pieces, that is, the position of the machine support on the guide columns must be considerably lowered with this proposed guide requiring a readjusting spring force to be excessively large. Additionally, with the proposed guide, it is only possible to use the outer peripheral surface or borders of the bottom plate as a guide during a milling operation and, consequently, the guide is not suitable for a number of milling works.

The aim underlying the present invention essentially resides in providing a drilling and milling guide which offers a universal application possibility so that it is feasible to accommodate different machine types as well as to enable an installation of movable guide stops.

In accordance with advantageous features of the present invention, ends of the readjusting spring, not adjoining a machine support, are fixed at a separate abutment adapted to be moved and stopped along the guide columns, with the bottom plate being provided with two parallel channels which are located parallel to a plane of the bottom plate and accommodate two guide rods at which a guide stop is mounted. Each of the channels passes closely along the guide columns and vertically cross a plane of the two guide columns. The abutments of the readjusting springs, each of which can be stopped on the guide columns, makes it possible to adjust the readjusting spring force to the respective desired initial position of the machine support whereby an electric powered hand drilling machines with a pre-set fixing device as well as milling machines with short collet chucks can be inserted into the drilling and milling guide and, in both cases, an easy control is possible. Both parallel channels and the bottom plate allow for the arrangement of the movable guide stop thereby considerably increasing the application possibilities of the guide during a surface cutting. The channels vertically cross a plane of the two guide columns in order to make it possible to provide a guide in a direction of the pivot axis of the two guide columns. Only with this orientation of the channels can beveled edges and grooves be perfectly milled.

In accordance with the present invention, each of the channels pass closely adjacent the guide columns in order, on the one hand, to achieve a small size of the bottom plate and therewith an easy handling of the guide and, on the other hand, to achieve, with a given size of the bottom plate, optimum wide distances between the guide columns as well as between the guide rods.

In accordance with further features of the present invention, the machine support includes two upwardly directed lugs on the guide column, with a center area of the lugs being formed as chambers for respectively accommodating a readjustable spring and an abutment member. By this arrangement, the readjusting springs will automatically be carried along with an adjustment of an initial position of the machine support. The initial position of the machine support and the abutment member does not need to be adjusted separately but is determined together in the course of a normal positioning of the abutment members. The height of the readjusting spring force is readily given by the size of the respective chambers and is therewith the same for every initial position so as to render unnecessary a subsequent special adjustment.

In accordance with the present invention, a scale member is disposed within at least one of the lugs, with the scale member being adapted to be adjusted in parallel to the guide column. The scale member is brought into engagement with the abutment member so as to limit a lifting and define a displacement distance of the machine support. In this manner, an adjustable limit of the lift of the machine support is carried along with a displacement of a normal position of the machine support. Consequently, there will be no adjusting or operating problems with regard to a resetting upon an interchanging of, for example, a hand power drill for a milling machine.

According to the present invention, a total width of the guide columns rests upon the bottom plate, with the guide columns being fixed at the bottom plate in a direction of their longitudinal axis. With this connection between guide columns and the bottom plate, a wide clamping surface for secure fixing can be achieved without increasing the overall height of the guide. The lower end of the guide columns can be placed so closely above the bottom plate that even a milling machine with a very short clamping collet can be arranged close enough to the work piece to be treated and there is still a sufficient advance path for carrying out a milling operation.

According to the present invention, each guide column includes a cylindrical collar portion cooperable with rounded surface portions provided on the bottom plate. The round surface portions include a longitudinally extending slit about the periphery of the round surface through which the fixing means for the guide columns extend and by which the guide columns may be adjusted. The fixing means for fixing the guide columns to the bottom plate is located at the lower end of the guide column. With this connection between the guide columns and the bottom plate, the guide columns can be pivoted through an angle of about 180° whereby a safe stepless fixing in any desired angular position is possible. The clamping surface between the cylindrical collars and the round surface portion is so wide that also with higher pressures, as might occur during a milling operation, a stable condition of the guide columns and the machine support is ensured.

Advantageously, the bottom plate has two opposed circular peripheral portions respectively interconnected by substantially vertical flat or planar side faces, with the channels being arranged between the guide columns. By virtue of the circular peripheral portions of the bottom plate, a guide of the bottom plate along a rail or the like ensures that an always invariable distance between the rail and tool is maintained and also, with a slight turning of the guide, it is possible to, for example, mill exact and straight-lined grooves.

The side faces adjacent the guide columns and the arrangement of the guide channels between the guide columns results in a further reduction in the size of the bottom plate thereby dispensing with the need to extend the bottom plate especially in a milling direction so that it is possible, with the guide of the present invention, to mill very close to walls, limits, or the like.

In accordance with the present invention, the guide stop can be fashioned as a right-angled Z-shaped stop piece, with one end side being provided with through channels for accommodating the guide rods and detent or fixing means cooperable with the guide rods. The other side of the Z-shaped guide member is formed as a stop face as a flat basic rail at which a detachable extension plate may be fixed. By the arrangement of the guide stop as a right-angled Z-shaped guide member it is possible for the original stop face to be located below the bottom surface of the guide which is of great importance particularly during a surface cutting. The construction of the stop face as a flat basic rail serves for milling plane surfaces of planes or the like, with the extension plate allowing for a correct alignment of the guide during a face milling operation. With the features of the invention, the guide stop can be used in many ways and at the same time relatively low cost. Thus, a new guide stop is formed by a detachable extension plate using the original Z-shaped guide member. Consequently, the number of accessories is considerably reduced. Furthermore, the detachability of the guide stop allows another application of the guide rods such as, for example, the installation of a compasses pointed foot at one end of one of the rods, around which foot the drilling and milling guide can circle.

In accordance with still further features of the present invention, a tapped hole may be provided at an outer lateral face of the bottom plate for enabling a threaded attachment of an associated bent member provided with an adjustable circular stop. By virtue of the provision of a circular stop, the guide can be moved along round or circular outlines in order to produce beveled borders such as used in, for example, styling furniture, balcony linings, or the like. Moreover, the adjustability of the stop serves for adapting the guide to the actual work pieces, milling cutter, etc.

In accordance with still further features of the present invention, the bottom plate may be provided with fixing device such as, for example, threaded holes, for enabling a stationary fixing at an associated table arm, which can be fixed with a supporting side thereof at a workbench or the like. The application possibilities of the drilling and milling guide are again considerably amplified by virtue of these last mentioned features as in many cases the stationary fixing, for example, of a milling motor of a table type milling cutter, facilitates and accelerates an exact working. The table arm is fixed at the workbench in such a manner that the side faces thereof stay in alignment with the surface of the workbench. Consequently, the workbench can also be used as a resting surface for the workpieces. Also, with a stationary fixing of the guide at one associated table arm, the channels in the bottom plate can be used for fixing the guide stops and no special guide stops need be provided at the table arm itself. In spite of this additional considerable application possibilities of the milling guide are possible with only unimportant additional costs arising.

Advantageously, in accordance with the present invention, the table arm may be provided with two slits or openings for accommodating the guide angle, bearing the circular stop, and two openings in an area of lower ends of the guide columns. In this manner, with a stationary operation as a table milling cutter, an adjustable circular stop may be employed. The openings in an area of the lower end of the guide columns allow a free access to the fixing device for the guide columns so that, with a change of inclination position, the guide can remain at the table arm. Therefore the operation, even with a stationary fixing of the drilling and milling guide of the present invention is still nevertheless very easy.

The above and other objects, features, and advantages of the present invention will become more apparent from the following description when taken in connection with the accompanying drawings which show, for the purpose of illustration only, several embodiments in accordance with the present invention, and wherein:

FIG. 2 is a cross-sectional view of a portion of the guide of FIG. 1 taken along the line II—II in FIG. 1;

FIG. 3 is a cross-sectional view of a clamping member of a guide column of the drilling and milling guide of the present invention taken along the line III—III in FIG. 1;

FIG. 4 is a bottom view of the drilling and milling guide of the present invention with a mounted circular shaped stop taken in the direction of the arrow IV in FIG. 1;

Figure 1:
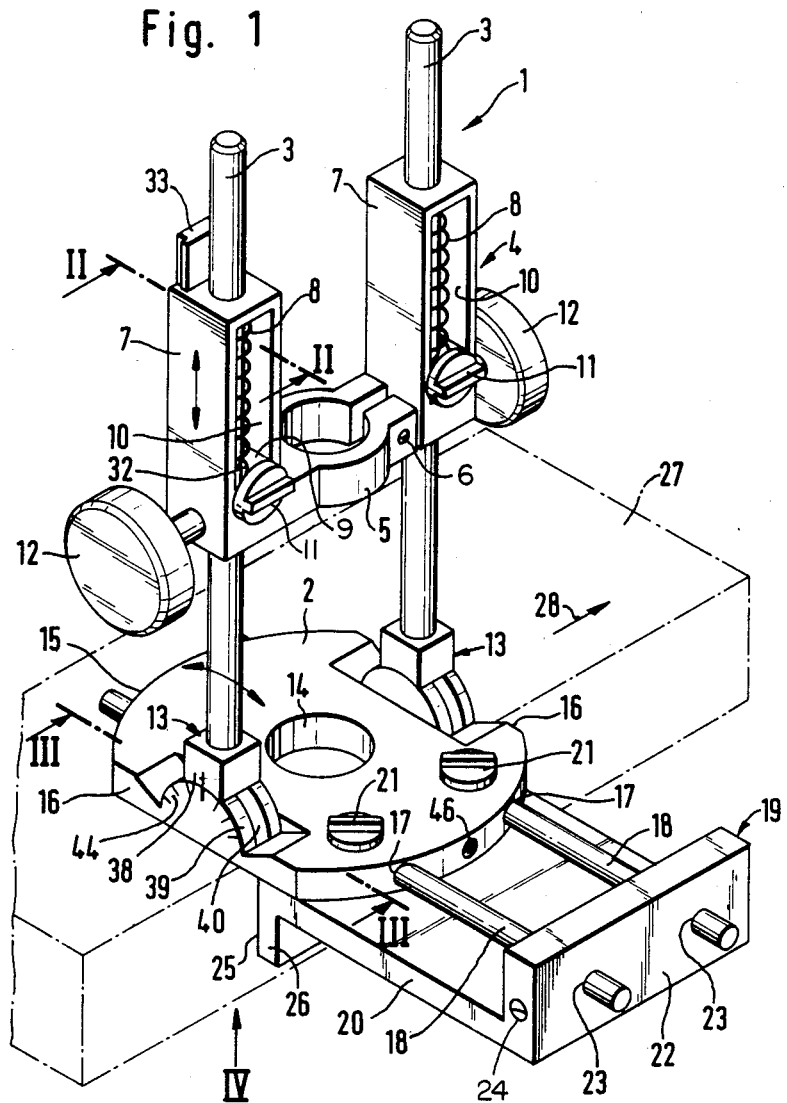
FIG. 1 is a perspective view of a drilling and milling guide constructed in accordance with the present invention.

Referring now to the drawings wherein like reference numerals are used throughout the various views to designate like parts and, more particularly, to FIG. 1, according to this figure, a drilling and milling guide generally designated by the reference numeral 1 includes a bottom plate 2, two guide columns 3, and a machine support generally designated by the reference numeral 4, with the machine support 4 including a split ring 5 adapted to fix a neck of, for example, an electrically powered hand operated drilling machine, through a fastening means 6, and two cast vertically extending lugs 7 displaceably guided along the guide column 3. Each of the lugs 7 includes a chamber 10 substantially in a central area thereof for respectively accommodating an adjusting spring 8 and an abutment member 9. The abutment members 9 are adapted to be secured at the guide columns 3 by fixing screws 11. Two hand operating levers 12 are also provided on the machine support 4 for enabling a downward displacement of the machine support 4 with a power tool mounted therein. Moreover, the provision of the operating levers 12 facilitates the overall positioning and control of the guide 1. To enable a fixing of the machine support 4 at adjusted positions along the guide column 3, independently of the abutment members 9, one of the two hand levers 12 includes at least a fixing screw portion. The guide columns 3 are mounted at the bottom plate 2 by fixing or clamping members 13 thereby enabling the guide column 3 to pivot with respect to the bottom plate 2 in the direction of the double arrows.

A central opening 14 is provided in the bottom plate 2 for accommodating a tool such as, for example, a power operated hand drill machine or a milling machine. The bottom plate 2 has a substantially circular outer peripheral surface 15 with two plain side faces 16 disposed diametrically opposite to each other in a plane of the bottom plate 2 which extends substantially vertically with respect to the plane of the guide columns 3. The side surfaces are disposed adjacent the guide columns 3. Two channels 17 for respectively accommodating guide rods 18 are disposed between the guide columns 3 at the bottom plate 2, with the channel 17 extending in parallel to the side faces 16. A guide stop generally designated by the reference numeral 19, having a substantially right-angle Z-shaped configuration is mounted on the guide rods 18. A center leg 20 of the guide stop 19 is disposed in parallel to the guide rods 18 which are secured in the bottom plate by, for example, fixing screws 21. One of the end legs 22 of the guide stop 19 is provided with two through holes or openings 23 for accommodating the guide rods 18. The end leg 22 can be fixed along the guide rods 18 by, for example, fixing screws 24, only one of which is shown in FIG. 1. A second leg 26 of the guide stop 19 forms a stop surface 25 adapted to be located along a face of a work piece 27 clamped at a plane surface along which the guide 1 is moved in a direction of the arrow 28. In order to enable a circular displacement of the guide 1, instead of the guide stop 19, it is also possible to provide a compasses type mounting at one of the guide rods 18.

As shown in FIG. 2, an upper end 29 of the readjusting spring 8 abuts at an upper cover plate 30 of the lug 17 and therewith at the machine support 4 since the machine support 4 and the cover plate are firmly fixed together by the side walls 31. A lower end 32 of the readjusting spring 8 abuts the abutment member 9 fixed at the guide column 3 by means of a fixing screw 11. After a loosening of the fixing screw 11, the machine support 4 can freely move up and down the guide column 3 whereby the spring 8 is automatically carried therewith in the chamber 10. After a tightening of the fixing screw 11, an advance for carrying out the drilling and milling operation can be executed only against the force of the readjusting spring 8 whereby the readjusting spring force always remains the same independently of the selected initial position.

In order to limit and/or set the displacement of the machine support, a scale member 33 may be disposed in, for example, a groove 34 in the side wall of one of the lugs 7, with a screw 35 being provided for enabling an adjustment of the scale member 33. As shown in FIG. 2, with the scale member in an adjusted position, upon a displacement of the machine support, the end of the scale member is brought into abutment with the abutment member 9.

As shown most clearly in FIG. 3, the clamping member 13 of the guide column 3 may be fixed at the bottom plate 2 by a fixing device generally designated by the reference numeral 36 which, for example, includes a fixing screw 34 extending in a direction of the longitudinal axis of the guide column 3. The clamping member 13 advantageously includes a cylindrical collar portion 38 which is located on and cooperable with a curved or rounded surface portion 39 formed on the bottom plate 2. The curved or rounded surface portion 39 includes a longitudinally extending slit 40 which displaceably accommodates the fixing screw 37 so that the guide column 3 can be pivotally displaced in a direction of the arrow 41 over a total pivot angle of about 180°. By virtue of the wide base surface 42 of the collar 38 and the associated clamping member 43, it is possible to securely position the guide column 3 in any desired adjusted position. The curved surface portion 39 is provided with a scale 44 for enabling an exact adjustment of the pivot angle of the guide columns 3. A pivot axis Z of the guide column 3 is nearly one-half of a height or thickness of the bottom plate 2, with the pivot axis diametrically passing through the central opening 14 in the bottom plate 2.

As shown in FIG. 4, the bottom plate 2 is provided with tapped holes 46 with the outer edge face 45 thereof for enabling an attachment of an associated bent member 47 provided with an adjustable circular stop or guide 48. By virtue of the provision of the member 47 and circular guide or stop 48, it is possible to follow a shape of the work piece 49 provided with, for example, curved surface portions 50. As shown in FIG. 4, the channel 17, indicated in phantom line, each extend between the center opening 14 and the clamping member 13. By virtue of the above described arrangement of the components with respect to the bottom plate 2, it is possible to optimize the available space in the bottom plate 2.

Figure 5:
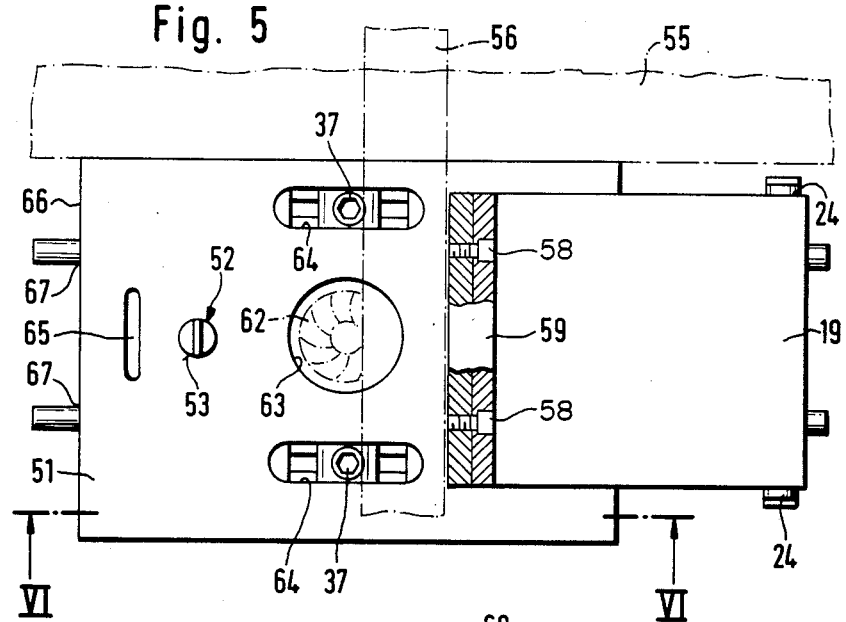
FIG. 5 is a top view of a table arm having the drilling and milling guide of the present invention mounted below.
Figure 6:
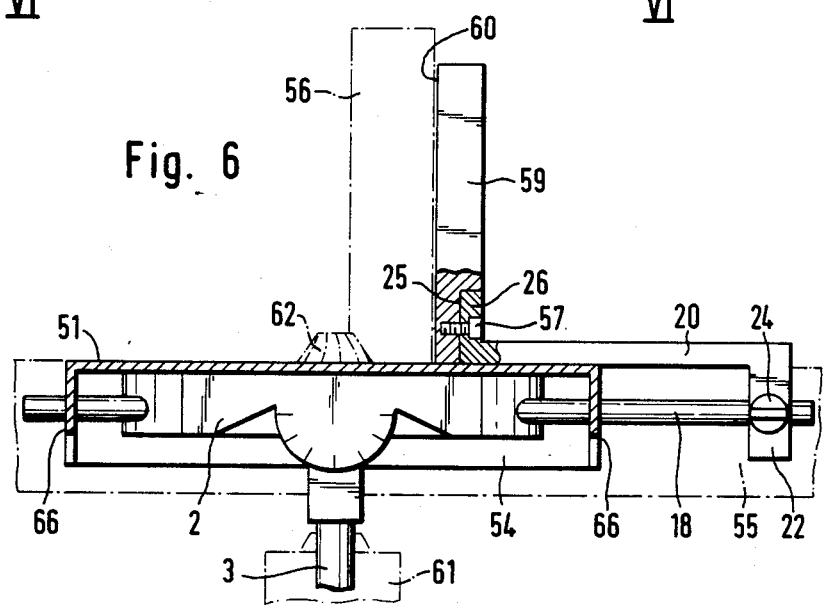
FIG. 6 is a cross-sectional view of the table arm taken along the line VI—VI in FIG. 5.

In order to enable a stationary operation of the guide 1 to permit, for example, a table type milling cutter, as shown in FIGS. 5 and 6, the bottom plate 2 is fixed to a table arm 51 by fixing devices 52 such as, for example, screw holes 53 in a manner similar to FIG. 4. The table arm 51, of a plate type construction, is fixed at a workbench 55 with a support leg 54. Therewith the support leg extends vertically to the plane mounted between the two guide columns 3. Thus, the surface of the work bench 55 can also be used for guiding a work piece 56. In the illustrated example of FIGS. 5 and 6, the Z-shaped guide stop 19 is used with one leg 26 being formed as a flat basic rail 57. An extension plate or surface 59 may, for example, be provided at the basic rail 57 and be attached, for example, by screws 58 so that the original stop surface 25 is extended so as to form a considerably larger stop surface 60. By virtue of the provision of the extension plate 59, it is also possible to carry out a face milling or face drilling of the plate-shaped work piece 56. With, for example, a form cutter 62, it is possible to achieve a beveled edge when the cutter 62 is set in a chuck 61 of a drilling machine. With the guide 1 constructed in accordance with the present invention, such a beveled edge could also be achieved with a cylindrical cutter by inclining the guide columns 3. As can readily be appreciate, a face milling operation is also possible without using the table arm 51.

The table arm 51 is provided in a middle section thereof with a central opening 63 for accommodating a tool as well as two further openings 64 which provide free access to the fixing devices 37 of the clamping member 13. Moreover, slits 65 are provided in the table arm 51 for accommodating the bent member or rail 57 bearing the circular stop or guide 48. Holes or openings 67 are provided in the side legs 66 so as to enable a passage of the guide rods 18.

While I have shown and described several embodiments in accordance with the present invention, it is understood that the same is not limited thereto but is susceptible to the numerous changes and modifications as known to one having ordinary skill in the art and I therefore do not wish to be limited to the details shown and described herein, but intend to cover all such modifications as are encompassed by the scope of the appended claims.

I claim:

1. A drilling and milling guide for interchangeably accommodating power tools, the guide comprising a bottom plate, a pair of spaced parallel guide columns, means for pivotally mounting the guide columns on the bottom plate, a machine support means displaceably mounted on said guide columns, a pair of vertically extending lug means provided at said machine support means and mounted on said guide columns, each of the lug means includes a chamber means and each of the guide columns passes through a respective one of said chamber means, a pair of spring means for normally urging the machine support means in a direction away from the bottom plate, each of the spring means are respectively mounted within one of said chamber means, a first end of each of the spring means abutting a first portion of the respective chamber means, a pair of abutment means interposed between a second end of each of said spring means and an opposite portion of the chamber means and displaceably mounted on said guide columns, means for enabling a fixing of the abutment means at an adjusted position along the guide columns, and an opening provided in a central area of the bottom plate for accommodating a tool.

2. A drilling and milling guide according to claim 1, further comprising a guide stop means, a pair of guide rod means for mounting the guide stop means to the bottom plate, and a pair of spaced parallel channel means for respectively accommodating the guide rod means, said channel means extending in parallel with a medium plane of the bottom plate and are disposed therein so as to pass near the respective guide columns and extend orthogonally with respect to the plane of the two guide columns.

3. A drilling and milling guide according to claim 1, further comprising a scale means adjustably mounted on one of the lugs for defining and limiting a displacement of the machine support means.

4. A drilling and milling guide according to claim 3, wherein a total width of each of the guide columns rests on the bottom plate, and means are provided for fixing the guide columns in a direction of their longitudinal axis.

5. A drilling and milling guide according to claim 4, wherein the bottom plate includes a pair of spaced rounded support surfaces, a slit is provided in each of the support surfaces and extends about a periphery thereof for enabling the guide columns to be secured to the bottom plate, each of said guide columns includes a rounded collar portion respectively cooperable with the rounded support surfaces, and wherein said means for fixing the guide columns includes means extending through the slits and cooperable with the collar portions to fix the guide columns to the bottom plate.

6. A drilling and milling guide according to claim 5, wherein said bottom plate includes a pair of opposed portions having a circular outer peripheral contour and a pair of opposed plain side faces disposed adjacent to the guide columns and disposed in a vertically extending plane, and wherein said channel means are disposed in the bottom plate between the guide columns.

7. A drilling and milling guide according to claim 6, wherein said guide stop means is formed as a right-angled Z-shaped guide member, one end of the guide member is provided with a pair of through openings for respectively accommodating the guide rod means, a second end of the guide member forms a stop face adapted to cooperate with a work piece.

8. A drilling and milling guide according to claim 7, further comprising a circular stop means, and means for mounting the circular stop means along an outer peripheral surface of the bottom plate.

9. A drilling and milling guide according to claim 8, wherein the circular stop means includes a bent plate member and a circular member adjustably mounted on the bent plate member, and wherein said means for mounting the circular stop means includes a tapped hole provided in a lateral edge surface of the bottom plate.

10. A drilling and milling guide according to claim 9, further comprising means in the bottom plate for enabling a stationary fixing of the guide at a table arm fixed to a workbench.

11. A drilling and milling guide according to claim 10, wherein the table arm is provided with means for accommodating the bent plate member, and openings in an area of a bottom of the guide columns for providing free access to the means for fixing the guide columns to the bottom plate.

12. A drilling and milling guide according to claim 1, wherein a total width of each of the guide columns rests on the bottom plate, and means are provided for fixing the guide columns in a direction of their longitudinal axis.

13. A drilling and milling guide according to claim 12, wherein the bottom plate includes a pair of spaced rounded support surfaces, a slit is provided in each of the support surfaces and extends about a periphery thereof for enabling the guide columns to be secured to the bottom plate, each of said guide columns includes a rounded collar portion respectively cooperable with the rounded support surfaces, and wherein said means for fixing the guide columns includes means extending through the slits and cooperable with the collar portions to fix the guide columns to the bottom plate.

14. A drilling and milling guide according to claim 1, wherein said bottom plate includes a pair of opposed portions having a circular outer peripheral contour and a pair of opposed side faces disposed adjacent to the guide columns and disposed in a vertically extending plane, and wherein said channel means are disposed in the bottom plate between the guide columns.

15. A drilling and milling guide according to claim 1, wherein said guide stop means is formed as a right-angled Z-shaped guide member, one end of the guide member is provided with a pair of through openings for respectively accommodating the guide rod means, a second end of the guide member forms a stop face adapted to cooperate with a work piece.

16. A drilling and milling guide according to claim 15, further comprising an extension plate detachably connected to the second end of said guide member.

17. A drilling and milling guide according to claim 1, further comprising means in the bottom plate for enabling a stationary fixing of the guide at a table arm fixed to a workbench.

18. A drilling and milling guide according to claim 17, further comprising a circular stop means, and means for mounting the circular stop means along an outer peripheral surface of the bottom plate, the circular stop means includes a bent plate member and a circular member adjustably mounted on the bent plate member, and wherein said means for mounting the circular stop means includes a tapped hole provided in the lateral edge surface of the bottom plate.

19. A drilling and milling guide according to claim 18, wherein the table arm is provided with means for accommodating the bent plate member, and openings in an area of a bottom of the guide columns for providing free access to the means for fixing the guide columns to the bottom plate.

20. A drilling and milling guide according to claim 1, further comprising a circular stop means, and means for mounting the circular stop means along an outer peripheral surface of the bottom plate.

21. A drilling and milling guide for interchangeably accommodating power tools, the guide comprising a bottom plate, a pair of spaced parallel guide columns, means for pivotally mounting the guide columns on the bottom plate, a machine support means displaceably mounted on said guide columns, a pair of spring means for normally urging the machine support means in a direction away from the bottom plate, a first end of each of the spring means abutting a portion of the machine support means, abutment means abutting a second end of each of said spring means and displaceably mounted on said guide columns, means for enabling a fixing of the abutment means at adjusted positions along the guide columns, a guide stop means, a pair of guide rod means for mounting the guide stop means to the bottom plate, a pair of spaced parallel channel means for respectively accommodating the guide rod means, said channel means extending in parallel to a median plane of the bottom plate and disposed therein so as to pass near the respective guide columns and extend orthogonally with respect to the plane of the two guide columns, and an opening provided in a central area of the bottom plate for accommodating a tool.

22. A drilling and milling guide according to claim 21, wherein the machine support means includes a pair of vertically extending lugs respectively mounted on the guide columns, each of said lugs including a chamber means for accommodating the spring means and the abutment means.

* * * * *